Dec. 11, 1923.  1,476,942
J. C. YOUNGBLOOD
FUELIZER AND PREHEATER
Filed March 13, 1922
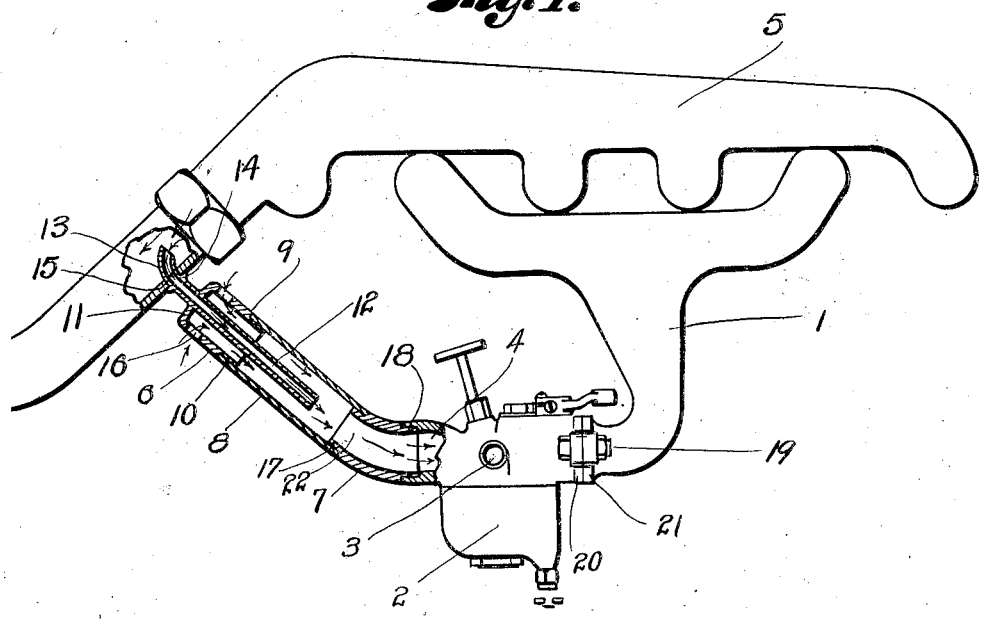
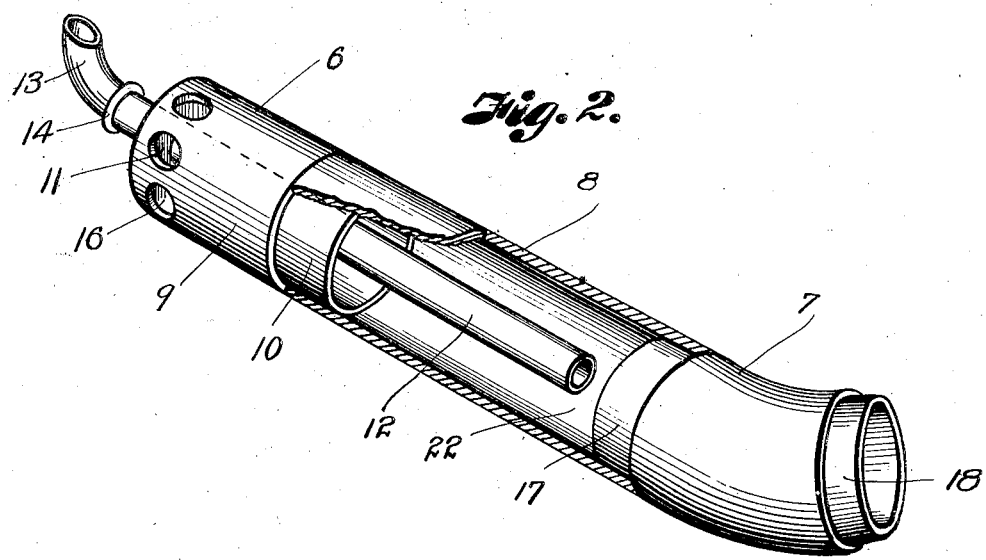
INVENTOR
Joseph C. Youngblood
BY
ATTORNEY Patented Dec. 11, 1923.

1,476,942

UNITED STATES PATENT OFFICE.

JOSEPH C. YOUNGBLOOD, OF ATWOOD, KANSAS.

FUELIZER AND PREHEATER.

Application filed March 13, 1922. Serial No. 543,357.

*To all whom it may concern:*

Be it known that I, JOSEPH C. YOUNG-BLOOD, a citizen of the United States, residing at Atwood, in the county of Rawlins and State of Kansas, have invented certain new and useful Improvements in Fuelizers and Preheaters; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a fuelizer and preheater for internal combustion engines and it contemplates utilizing some of the exhaust gases as part of the fuel charge as well as to take advantage of the heat of the exhaust gases for preheating the incoming charge fed to the combustion chamber of the engine.

In carrying out my invention the products of combustion which pass from the internal combustion engine, or at least some of them, are directed from the hottest part of the exhaust manifold into the main air opening of the carburetor so that the exhaust gases which are returned to the combustion chamber pass through the carburetor and carry with them air to supply the necessary oxygen to support combustion, the air being drawn in from a point outside of the carburetor and heated preliminarily to passing it therethrough. The heated air and gases therefore more readily combine with the hydrocarbon content of the fuel mixture within the carburetor so that a highly satisfactory combustible charge will be introduced into the combustion chamber of the engine.

Another important feature of my invention is that all air entering the carburetor must combine with the gas to absorb some of the heat thereof so that no cold air enters the carburetor to mix with the hydrocarbon content, such as the gasoline, etc.

It is also a feature of my invention that not only is the heat supplied by the waste gases but the waste gases frequently contain a portion of unburnt hydrocarbon which can be converted into energy in the combustion chamber of the engine if returned thereto and I have provided means whereby these unexploded gases can be caused to re-enter the mixing chamber along with the fresh fuel so that there will be a considerable saving in gasoline.

My invention can be readily attached to an existing type of engine with very little change in the engine organization. As a matter of fact, the only change necessary is the tapping of a hole in the exhaust manifold, preferably at the hottest point, to provide an inlet for the preheater and fuelizer, the opposite end of the preheater and fuelizer communicating with the air intake of the carburetor, and the carburetor can be fastened to the intake manifold in the usual way.

Referring now to the drawings:

Fig. 1 is an elevational view of an intake manifold and an exhaust manifold of an existing type of motor vehicle showing the carburetor attached to the intake manifold and the fuelizer and preheater in section, and Fig. 2 is an enlarged, perspective view of the fuelizer and preheater, parts being broken away to show the interior construction thereof.

1 designates the intake manifold and 2 the carburetor therefor having a hydrocarbon or gasoline inlet 3 and an air intake 4. 5 designates the exhaust manifold. The carburetor, the intake manifold and the exhaust manifold are all old and well known.

My invention is shown as consisting of a device consisting of two end sections 6 and 7 and an intermediate tubular section 8 sleeved on the inner ends of the respective sections 6 and 7.

The section 6 may consist of a casting having an outer tubular portion 9 with a restricted neck 10, upon which the tube 8 is sleeved. The outer end of the portion 9 is closed by an end wall 11, through which extends an elongated pipe 12, long enough to extend into the tube 8.

The outer end of the pipe 12 projecting beyond the wall 11 is slightly curved, as at 13, and it is provided with a collar 14, adapted to abut against the discharge manifold 5 adjacent to the opening 15 therein, through which the end 13 projects.

The tube 9 is provided with a circular series of air inlet openings or ports 16 near the wall 11 and surrounding the pipe 12.

The section 7 also consists of a tube which may be a casting and it has a constricted neck 17 to receive one end of the tube 8, the opposite end of the tube 7 having a constricted neck 18 to be received within the inlet 4 of the carburetor 2.

The carburetor is fastened to the intake manifold 1 by the bolts 19, which pass through the flanges 20 and 21, as clearly seen in Fig. 1. When it is desired to apply my invention it will be only necessary to drill or tap the hole 15, preferably at the hottest part of the exhaust, remove the carburetor 2, apply the invention, and then secure the carburetor to the manifold by the bolts 19, the carburetor constituting the support for the fuelizer and preheater.

When the engine is operating, the intake strokes of the pistons will draw the hydrocarbon content of the fuel mixture into the opening 3 and it will also create suction in the tubular portions of the fuelizer and preheater. Some of the exhausted gases will be drawn from the exhaust manifold into the end 13 of the pipe 12 and atmospheric air will be drawn through the openings 16 to co-mingle with the exhausted gases in the mixing chamber 22 preparatory to entering the carburetor to co-mingle with the hydrocarbon content of the fuel mixture.

Since the atmospheric air will combine with the exhausted gases from the manifold 5 before entering the carburetor, it will be apparent that the air will have its temperature raised before it comes in contact with the hydrocarbon content of the fuel mixture so that the incoming charge will be at a temperature higher than atmosphere when it enters the combustion chamber, thus making the charge more easily exploded than if it were introduced into the combustion chamber at a low temperature and depended entirely upon the compression for a rise in temperature.

The general principle involved is well known as fuelizers and preheaters have been used prior to my invention but I am not aware that the exhausted gases from the exhaust manifold have been utilized as the heat medium for raising the temperature, nor am I aware that prior to my invention attempts have been made to utilize the unexploded gases as part of the fuel mixture to be introduced into the combustion chamber of the engine so that they may be re-used and thereby effect a saving in gasoline consumption.

While I prefer to construct the sections 6 as a casting I do not wish to be limited to this particular method of making it as it is obvious that it may be constructed by forming the tube 9 and pipe 12 of separate pieces and then brazing or welding the pipe 12 to the tube 9.

Attention is called to the fact that since the pipe 12 extends a considerable distance within the tubular structure, it co-operates with the perforations or openings 16 to provide in effect an ejector, the velocity of the gases in some instances at least assisting in drawing in the air through the ports 16 but whether this is true in all cases or not is immaterial because the suction through the carburetor will be sufficient to destroy the discharged gases from the manifold 5 through the pipe 12 as well as to draw air through the openings 16.

It will be apparent from the foregoing that by tapping the exhaust manifold or the exhaust pipe at the point of very high temperature, the exhaust gases will pass through the fuelizer and preheater with a temperature sufficiently high to heat the drawn-in air as well as to maintain the mixture at a relatively high heat and at a uniform heat as it passes into the engine to enter the combustion chamber.

I particularly wish to make a point of passing the heated air and products of combustion through the carburetor as distinct from those devices which lead some of the products of combustion back to the intake manifold of the engine to combine with the fuel mixture after it has passed the carburetor.

What I claim and desire to secure by Letters Patent is:

1. The combination with an intake manifold, a carburetor attached thereto, and an exhaust manifold for an internal combustion engine, of means for leading exhaust gases from the exhaust manifold to the carburetor, said means comprising a tubular structure having a restricted inlet port communicating with the exhaust manifold of the engine and said port extending a considerable distance into the tubular structure and surrounded by orifices in the walls of the tubular structure whereby the restricted port will constitute an injector for drawing atmospheric air into the tubular structure to be heated by the wall of the port before it will mix with the exhaust gases preparatory to entering the carburetor.

2. In a device of the class described, a tubular structure consisting of a central tube and two detachable end tubes, one end tube having means for connection with a carburetor, the other end tube having perforations in the wall thereof, a pipe extending through one end and into the central tube, the outer end of the pipe being in communication with the exhaust manifold of an internal combustion engine, and a curved extremity at the outer end of the pipe, the extremity being curved toward the flowing exhaust gases.

3. A device of the class described comprising a central tube and two end tubes connected together, one end tube having means for connection to a carburetor, the other end tube having an end wall, adjacent to which are openings, and a pipe extending through the end wall and longer than its tube so that one end can extend into the central member.

4. A device of the class described comprising an intermediate tubular member and two end members, one end member having a bore of uniform diameter throughout, the other member having its outer end closed by an end wall, and a pipe extending through the end wall with its ends projecting on opposite sides thereof, the inner end being longer than the member which supports it, and the other end of the pipe having means for engagement with the exhaust manifold of an internal combustion engine.

In testimony whereof I affix my signature.

JOSEPH C. YOUNGBLOOD.